(12) United States Patent
Cairns

(10) Patent No.: US 12,206,995 B2
(45) Date of Patent: Jan. 21, 2025

(54) PORTABLE INSPECTION DEVICE

(71) Applicant: CAIRNS INTELLECTUAL PROPERTY LIMITED, Brentford (GB)

(72) Inventor: Robin Cairns, Greater London (GB)

(73) Assignee: CAIRNS INTELLECTUAL PROPERTY LIMITED, Brentford (GB)

( * ) Notice: Subject to any disclaimer, the term of this patent is extended or adjusted under 35 U.S.C. 154(b) by 101 days.

(21) Appl. No.: 18/300,929

(22) Filed: Apr. 14, 2023

(65) Prior Publication Data
US 2023/0262342 A1 Aug. 17, 2023

Related U.S. Application Data

(63) Continuation of application No. PCT/IB2021/059528, filed on Oct. 15, 2021.

(51) Int. Cl.
| | |
|---|---|
| *H04N 23/63* | (2023.01) |
| *H04N 5/77* | (2006.01) |
| *H04N 23/62* | (2023.01) |
| *H04N 23/698* | (2023.01) |
| *H04N 23/71* | (2023.01) |
| *H04N 23/74* | (2023.01) |

(52) U.S. Cl.
CPC ............. *H04N 23/74* (2023.01); *H04N 5/772* (2013.01); *H04N 23/62* (2023.01); *H04N 23/631* (2023.01); *H04N 23/698* (2023.01); *H04N 23/71* (2023.01)

(58) Field of Classification Search
CPC .................................................. H04N 23/631
See application file for complete search history.

(56) References Cited

U.S. PATENT DOCUMENTS

2016/0269656 A1 9/2016 Tao et al.

FOREIGN PATENT DOCUMENTS

WO 2018/052604 3/2018

OTHER PUBLICATIONS

International Search Report and Written Opinion for PCT/IB2021/059528, dated Feb. 14, 2022, 17 pages.
"Waterproof Tablet RTC-1010 | 10.1" Waterproof Ruggedized Tablet Features with Intel N3350/N4200 Processor with Windows—AAEON", dated Aug. 8, 2020, https://web.archive.org/web/20200808150944/https://www.aaeon.com/en/p/10-inchesrugged-tablet-computers-rtc-1010.

*Primary Examiner* — Y Lee
(74) *Attorney, Agent, or Firm* — Robinson IP Law, PLLC

(57) ABSTRACT

A portable inspection device comprises a lighting component configured to provide an adjustable level of illumination, a camera having a wide angle lens, configured for recording a video of an area to be inspected, a memory for storing video data captured by the camera and a touch screen to receive input from a user, and to display output video. The device further comprises a controller to: receive an instruction from a user to initiate a video recording using the camera; determine a measure of the brightness of ambient lighting in the area to be inspected; adjust the level of illumination of the so lighting component; store recorded video data in the memory; receive a video playback instruction from a user to initiate playback of recorded video data stored in the memory; and initiate playback of the recorded video data in response to receiving the video playback instruction.

20 Claims, 9 Drawing Sheets

PORTABLE INSPECTION DEVICE

FIELD

This application relates to a portable inspection device and to a method for inspecting industrial equipment using a portable inspection device.

BACKGROUND

Industrial equipment is susceptible to faults and damage over time. For example, components can be missing or become loose or broken, or the equipment can suffer so from blockages and obstructions. It can be challenging to detect these faults, particularly when they occur in an internal or hard to reach area of the equipment. Current methods are bulky and require technical skill to use.

SUMMARY

This specification describes a portable inspection device. The device includes a lighting component configured to provide an adjustable level of illumination. The device also includes a camera having a wide angle lens, configured for recording a video of an area to be inspected. The device also includes a controller, embedded in the portable inspection device, the controller being configured to determine a measure of the ambient light level and to adjust the level of illumination of the lighting component based on the determined measure.

The portable inspection device may include a memory for storing video data captured by the camera. The controller may be configured to receive an instruction to initiate a video recording using the camera; store recorded video data in the memory; receive a video playback instruction to initiate playback of recorded video data stored in the memory; and initiate playback of the recorded video data in response to receiving the video playback instruction. Alternatively, or in addition, recorded video captured by the camera may be live streamed for immediate viewing.

The device may include a screen for displaying output video. Alternatively, or in addition, video may be displayed via an external display which is connected to the portable inspection device via a wired or wireless connection.

In a preferred embodiment, the device comprises a touch-screen which is configured to receive input from a user, e.g. to receive instructions from a user for initiation and playback of a video recording.

In this way, the components of the device are collectively provided in a single, self-contained unit which can be used to record and review video data of the inspected industrial equipment. The device is also simple and intuitive to use via the touch screen, such that an unskilled user can operate the device.

Advantageously, the device can automatically react and adjust to changes in the brightness of the ambient lighting without user intervention. This is of particular advantage when the device is used to record video whilst being transported through industrial equipment, such as on a conveyor belt of the equipment, where the ambient lighting conditions may vary. The device can adapt to conditions ranging from bright sunlight to near-total darkness. This ensures that the quality of the video recording is maintained regardless of the surroundings.

By providing a camera having a wide-angle lens, the device is able to record video spanning the full expanse of the surroundings of the device. The wide angle lens is configured to encapsulate front facing, rear facing, left facing, right facing and top facing views. In some embodiments the wide angle lens may comprise a fish eye lens. In some embodiments, the wide angle lens may comprise a panoramic lens.

Advantageously, the device is designed to be compact and portable. In this way, it is able to be used to investigate, for example, confined, hard to reach areas of industrial equipment.

In some examples, portable inspection devices as described in embodiments herein may be used for outdoor inspection applications. In some embodiments, the portable inspection device may also include one or more wheels or other movable member(s) for moving the device along a surface. The portable inspection device may further include a wireless module configured to receive and execute instructions from a remote controller. The embedded controller may be configured to receive, via the wireless module, an instruction to control motion of the portable inspection device, and to drive, in response to receiving the instruction to initiate motion, the at least one movable member of the portable inspection device using the motor.

While wheels or other movable member(s) are particularly advantageous in the context of outdoor applications, they may also be used when the device is used for inspection of industrial equipment. For example, the user can remotely control the device to move within the industrial equipment. For example, the user can drive the device into a hard-to-reach or internal area of the industrial equipment without using a conveyor belt of the equipment, thus enabling more areas to be inspected, and allowing closer or more detailed inspection of areas of particular interest to the user (e.g. areas in which faults have previously been detected).

This specification also describes an inspection method. The method comprises receiving an instruction from a user to initiate a video recording using a camera of a portable inspection device. The method further comprises determining a measure of the ambient light level, and adjusting the level of illumination of a lighting component of the portable inspection device based on the determined measure. The method may be used for inspecting industrial equipment The method may also comprise storing recorded video data in a memory of the portable inspection device. The method may further comprise receiving a video playback instruction from a user to initiate playback of recorded video data stored in the memory, and initiating playback of the recorded video data in response to receiving the video playback instruction.

In some embodiments, the instruction to initiate a video recording and the video playback instruction may be received via a touch screen of the device.

So that the invention may be more easily understood, embodiments thereof will now be described by way of example only, with reference to the accompanying drawings.

DETAILED DESCRIPTION

This specification describes a portable inspection device for inspecting industrial equipment. The device is compact enough such that it can be positioned on a conveyor belt which passes through an area of the industrial equipment to be inspected. Prior to inspection, a user can input, via a touch screen of the portable inspection device, an instruction to initiate a video recording using a camera of the device. The video recording captures images of the industrial equipment in the area surrounding the device. These images can later be visually inspected and manipulated by the user to identify defects in the industrial equipment, such as broken or missing components. The images can also be used to identify the cause of any faults, for example by detecting items causing a blockage or obstruction in the flow of the conveyor.

Figure 1:
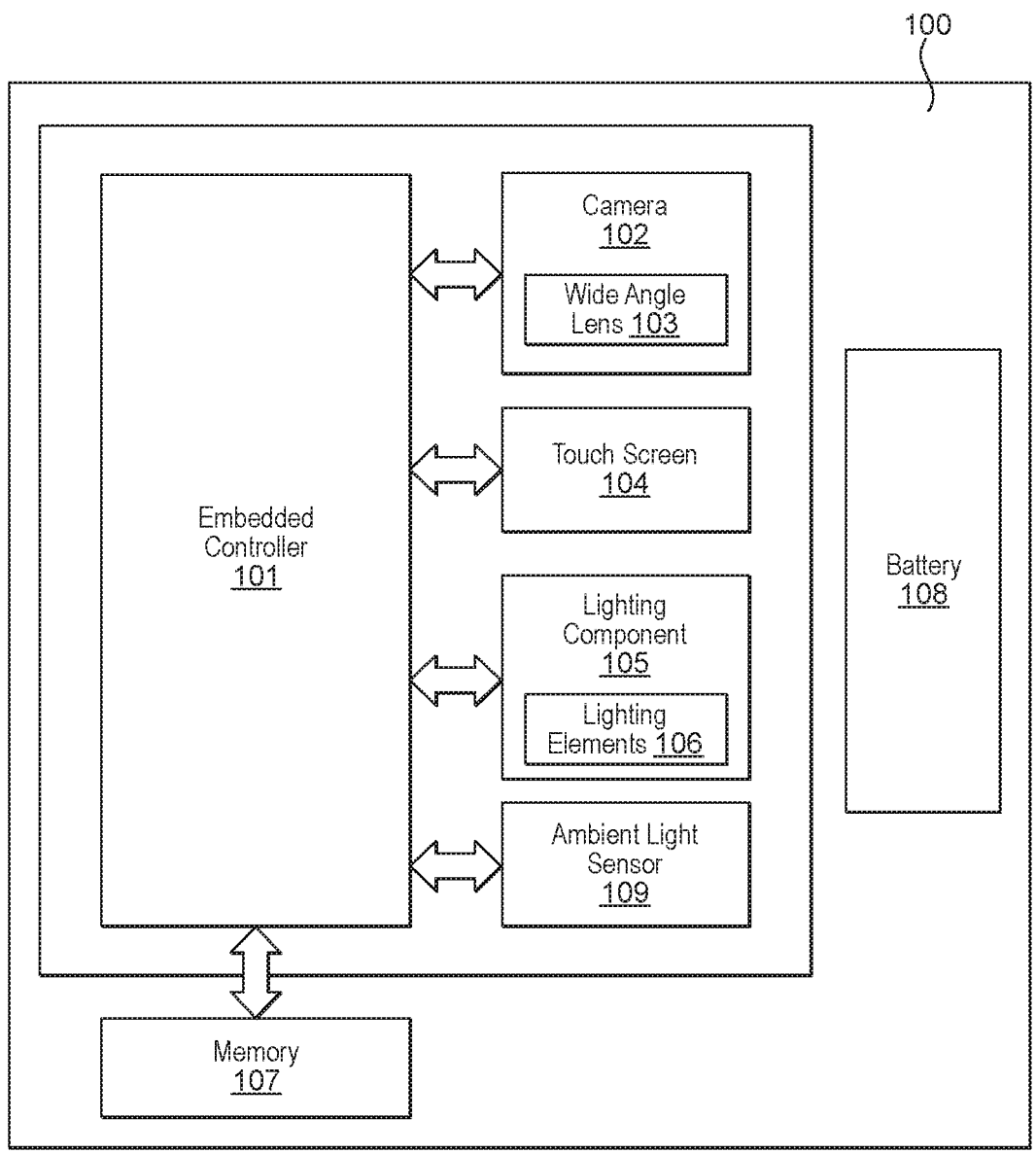
FIG. 1 shows a block diagram of a portable inspection device.

FIG. 1 is a block diagram depicting a portable inspection device 100 for inspecting industrial equipment. The device comprises an embedded controller 101 which is embedded in the device and is configured to interact with the other components to perform various actions, as will be described in more detail below.

The portable inspection device 100 includes a camera 102. Note that the device 100 may comprise a single camera. The camera may comprise a highly sensitive camera having a resolution in the megapixel range (e.g. 12 megapixels). The camera comprises a wide-angle lens 103. The wide angle lens 103 may be configured to enable the camera 102 to record images spanning a full hemisphere including front, rear, left, right and top facing views. Such a camera may be referred to herein as an 'omnidirectional' or '360°' camera. Such a camera allows the device to record images encompassing its full surroundings without the need for multiple or repeated recordings of the same region of the industrial equipment. In an embodiment the wide-angle lens 103 is a fish-eye lens. In an embodiment the wide-angle lens 103 is a panoramic lens. In some embodiments, the camera may comprise a power over ethernet (POE) enabled camera. In some embodiments the device may include more than one camera.

The portable inspection device 100 includes a touch screen 104. The touch screen 104 may be a capacitive touch screen. The touch screen 104 is configured to receive input from a user, and to display output video. The touch screen 104 is configured to display a graphical user interface (GUI). For example, the touch screen 104 may display a menu via the GUI providing a list of possible actions such as 'start recording' or 'start playback', and the user can select the required action from the menu. During playback, the recorded video data can be displayed on the touch screen. The user can directly interact with the displayed video via the touch screen 104 to perform functions such as pausing the playback, zooming the image, translating the displayed image, and annotating the image, for example. For example, the touch screen 104 may be a capacitive touch screen configured for pinch and zoom functionally to allow a user to zoom in to selected areas of the displayed video. Alternatively the touch screen may comprise a resistive touch screen. As another example, the touch screen 104 can be used to input contextual information which can be associated with the video recording. For example, the user may input details of a date, time and location of the recording, or information identifying the industrial equipment being inspected through the GUI. In an embodiment the GUI comprises a virtual keyboard configured to receive input from a user. For example, the virtual keyboard can be used to annotate images. As another example, the virtual keyboard can be used to input contextual information.

Another feature is video comparison where multiple recordings or images may be used to compare recording, video or still images to previous recordings. This is used to detect any changes between each. In the event to program would highlight these changes to the user by way of text or other forms within each recording.

The camera 102 may measure various aspects of images captured by the camera. An image captured by the camera may be divided into one or more regions, with each region associated with a particular lighting channel. An average pixel intensity within each region is measured. If the average pixel intensity is below a threshold, a level of lighting is increased or decreased depending on a quality of the image. If above the threshold, the level of lighting may further be incrementally adjusted, such as to try and increase a normal distribution, such as Gaussian distribution, of pixel intensities of the images. Various suitable algorithms may be utilized depending on application and desired areas or portions of machinery to be measured.

The device 100 includes a lighting component 105. The lighting component 105 may comprise one or more lighting elements 106. In an embodiment the one or more lighting elements 106 comprise one or more light-emitting diodes (LEDs), e.g. a plurality of LEDs. For example, the lighting component 105 may comprise strip LED lighting. Alternatively, the lighting component may comprise a single lighting element, e.g. a single LED.

In some examples, the lighting component may include a high colour rendering index (CRI) type LED. Such LEDs are capable of reproducing the colours of objects naturally in comparison with an ideal or natural light source. This has the benefit that faults or wear and tear such as rust etc are more readily discernible and detectable in the video recordings captured by the device. For example, the device may comprise an LED having a colour rendering index score above 80, or above 90.

The lighting component 105 may be configured to provide an adjustable level of illumination, e.g. to provide dimmable, variable lighting. In one embodiment the one or more lighting elements 106 of the lighting component 105 can be individually turned on and off. For example, when the device 100 is used in a relatively dim area, such as when the ambient lighting is below a given brightness threshold, more lighting elements can be turned on to provide additional illumination. Alternatively, when the device 100 is used in a well-lit area, such as when the ambient lighting is above a given brightness threshold, more lighting elements can be turned off, as additional illumination is not required. In another embodiment, the illumination of the one or more lighting elements 106 can be continuously varied.

Whilst the device is recording, the controller 101 can determine a measure of the brightness of ambient lighting in the area to be inspected, and adjust the illumination provided by the lighting component 105 based on said measure. This ensures that the recorded video is of the highest possible quality.

By automatically measuring the ambient brightness and adjusting the illumination accordingly, the device 100 can respond to changes in the ambient lighting. For example, as the device 100 is borne through the industrial equipment by the conveyor belt, the brightness of the ambient lighting may vary. The device 100 can respond to these changes and adjust the illumination provided by the lighting component 105 accordingly without the need for the user to intervene or reset the device. Thus, the quality of the resulting video recording can be maintained.

The device further comprises an internal memory 107. The memory 107 is configured to store recorded video data, and can be accessed by the embedded controller 101, which can initiate playback of the recorded video data via the touch screen 104. The memory 107 is also configured to store additional data associated with the recorded video data, such as user annotations or contextual information.

The device 100 can be connected to an external memory. Data stored in the memory 107 of the device 100 can be exported to the external memory through either a wired or wireless connection. For example, the data can be transferred to an SD card or USB storage device inserted into the device. Alternatively, the data can be transferred to a remote computing device or uploaded to a cloud-based data storage.

The embedded controller 101 comprises one or more processors configured to control operation of other components of device 100. The embedded controller 101 also has a working or volatile memory which the one or more processors may access in order to process data and may control the storage of data in memory. The volatile memory may for example comprise RAM of any type, for example Static RAM (SRAM), Dynamic RAM (DRAM). The controller also has a non-volatile memory which may be included in the memory 107 or in a separate memory of the controller 101. The non-volatile memory may store a set of operation instructions for controlling the operation of the controller in the form of computer readable instructions. The non-volatile memory may be a memory of any kind such as a Read Only Memory (ROM), or a magnetic drive memory.

The controller 101 is configured to execute operating instructions to cause the system/apparatus to perform any of the methods described herein. The operating instructions may comprise code (i.e. drivers) relating to the hardware components of the device 100, as well as code relating to the basic operation of the system/apparatus 100. Generally speaking, the controller 101 may execute one or more instructions of the operating instructions, which are stored permanently or semi-permanently in the non-volatile memory, using the volatile memory to temporarily store data generated during execution of said operating instructions.

The embedded controller 101 is configured to receive, via the touch screen 104, an instruction from a user to initiate a video recording using the camera 102. The controller 101 can determine a measure of the brightness of ambient lighting in the area to be inspected, and adjust the level of illumination of the lighting component 105 based on the determined measure. The controller 101 is configured to store the recorded video data in the memory 107.

After the device 100 has been used to record video of the industrial equipment, the user can initiate playback of the video recording via the touch screen 104. During playback, the user can manipulate the video by pausing, zooming, translating and/or annotating the recording, in order to identify and analyse any detected changes or faults.

The controller 101 is thus further configured to receive, via the touch screen 104, a video playback instruction from a user to initiate playback of recorded video data stored in the memory 107, and to initiate playback of the recorded video data in response to receiving the video playback instruction.

The device 100 also comprises a battery 108. The battery 108 may be a rechargeable battery. In some examples the device 100 may comprise one or more solar panels for producing electricity to power the device and/or to recharge the battery. The device 100 may also comprise a battery level indicator to indicate to the user when the battery 108 needs to be charged. For example, the battery level indicator could consist of coloured LEDs which appear red to indicate a low battery and green to indicate an acceptable battery level. Alternatively, or in addition, the battery level may be displayed on the touch screen 104 (e.g. as part of the graphical user interface), for example as a percentage scale (e.g. 0-100%).

In one embodiment the device 100 may comprise an ambient light sensor 109 configured to measure the brightness of the ambient lighting in the area to be inspected. The ambient light sensor may comprise a photosensor (e.g. a photodiode). In some cases a daylight harvesting sensor may be used. Such light sensors are well known per se to those skilled in the art and will not be described in detail here. The measure of brightness provided by the ambient light sensor 109 can be used to adjust the illumination provided by the lighting component 105 of the device, as described above.

Alternatively, or in addition, the brightness of the ambient lighting may be measured using the recorded video data. This is described in more detail below with reference to FIG. 8*b*.

Figure 2:
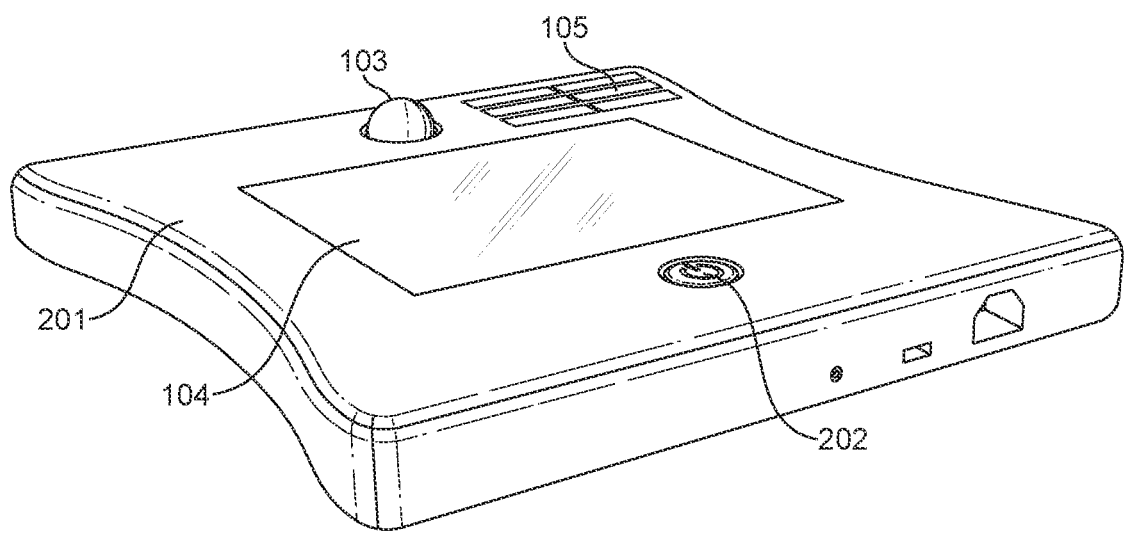
FIG. 2 shows an external view of a portable inspection device.
Figure 3:
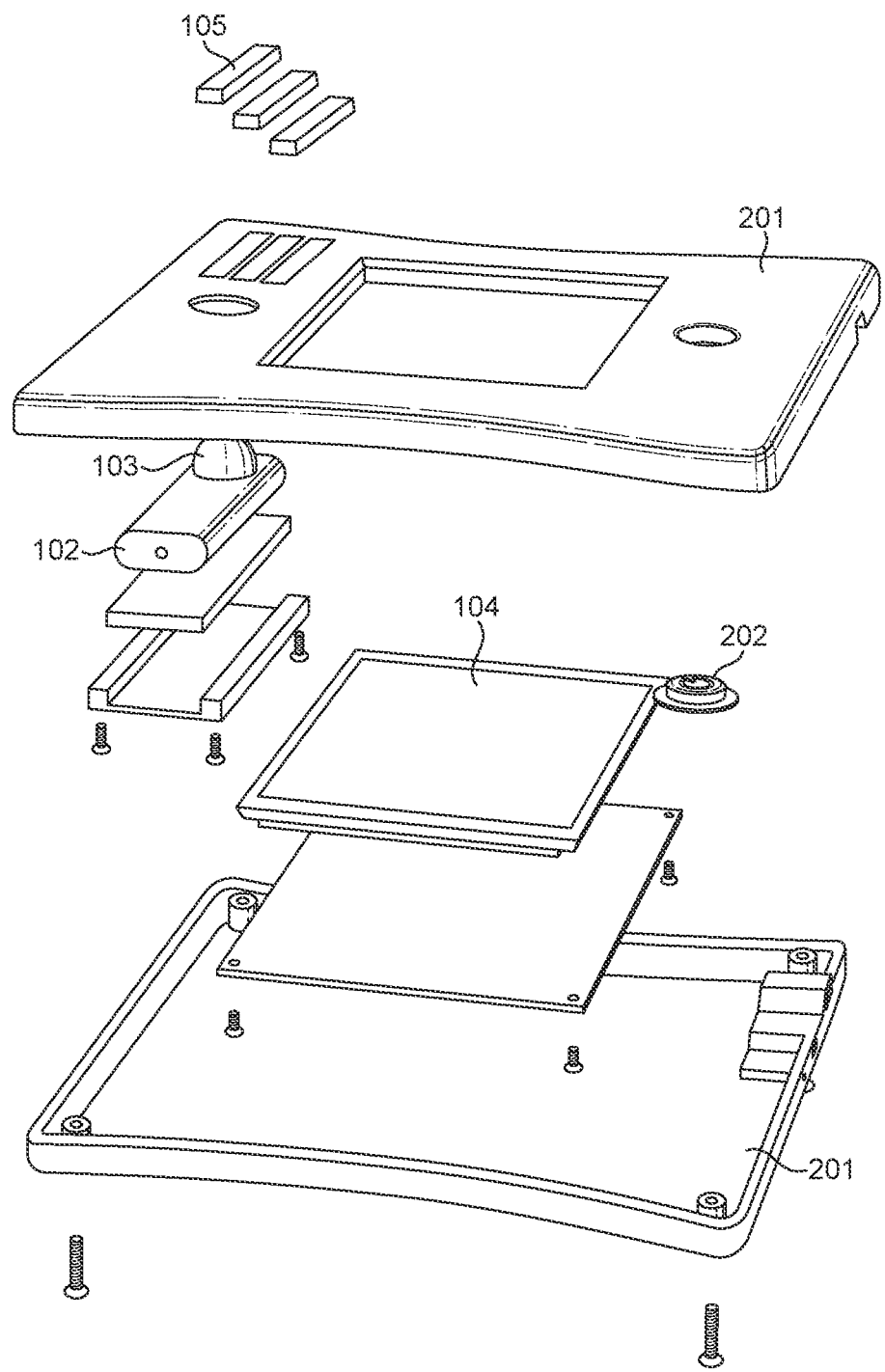
FIG. 3 shows an exploded view of the portable inspection device of FIG. 2.

FIG. 2 shows an external view of a portable inspection device in accordance with the device 100 described above. FIG. 3 shows an exploded view of the same device. The device is enclosed by a housing 201. The device also comprises a master power button 202.

Advantageously, the device 100 is designed to be compact and portable. This allows the device 100 to be used in small, confined areas of the industrial equipment. For example, the device may be configured to have a low profile such that it may be used to inspect the interior of a baking oven. For example, in one embodiment the total height of the device 100 does not exceed 40 mm. In one embodiment, the total weight of the device 100 does not exceed 2 kg.

Figure 4A:
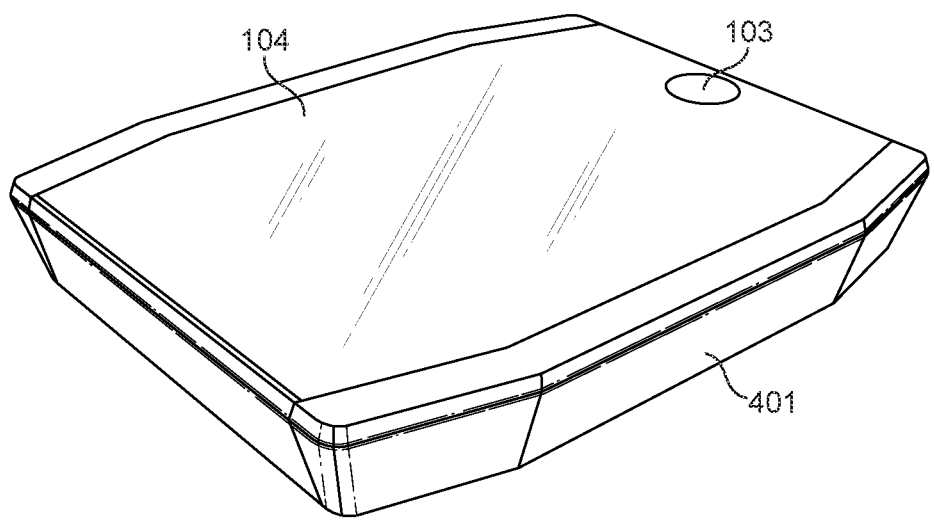
FIGS. 4*a* and 4*b* show alternative embodiments of a portable inspection device.
Figure 4B:
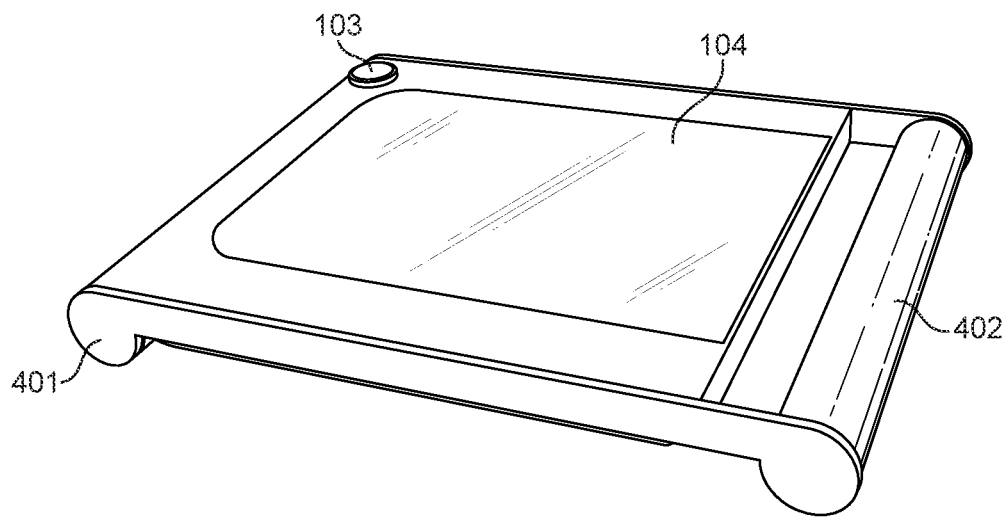

Various modifications and variations of the device 100 are possible. Example so embodiments are shown in FIGS. 4*a* and 4*b*. The device 100 may comprise a plastic housing having reinforced corners to protect it from damage. The corners may be reinforced by adding one or more rubberised surrounds 401 to the housing, as shown in FIG. 4*a*. This reinforces the device against damage, for example if the device was dropped or collided with a surface of the industrial equipment. FIG. 4*b* shows same portable inspection device, further comprising an integrated carry handle 402.

In an embodiment the device 100 may also comprise a microphone configured to receive a voice input from a user. The controller 101 can be configured, e.g. via speech recognition software stored on the device, to respond to a voice input received via the microphone in the same way as a touch input received via the touch screen 104.

Figure 5:
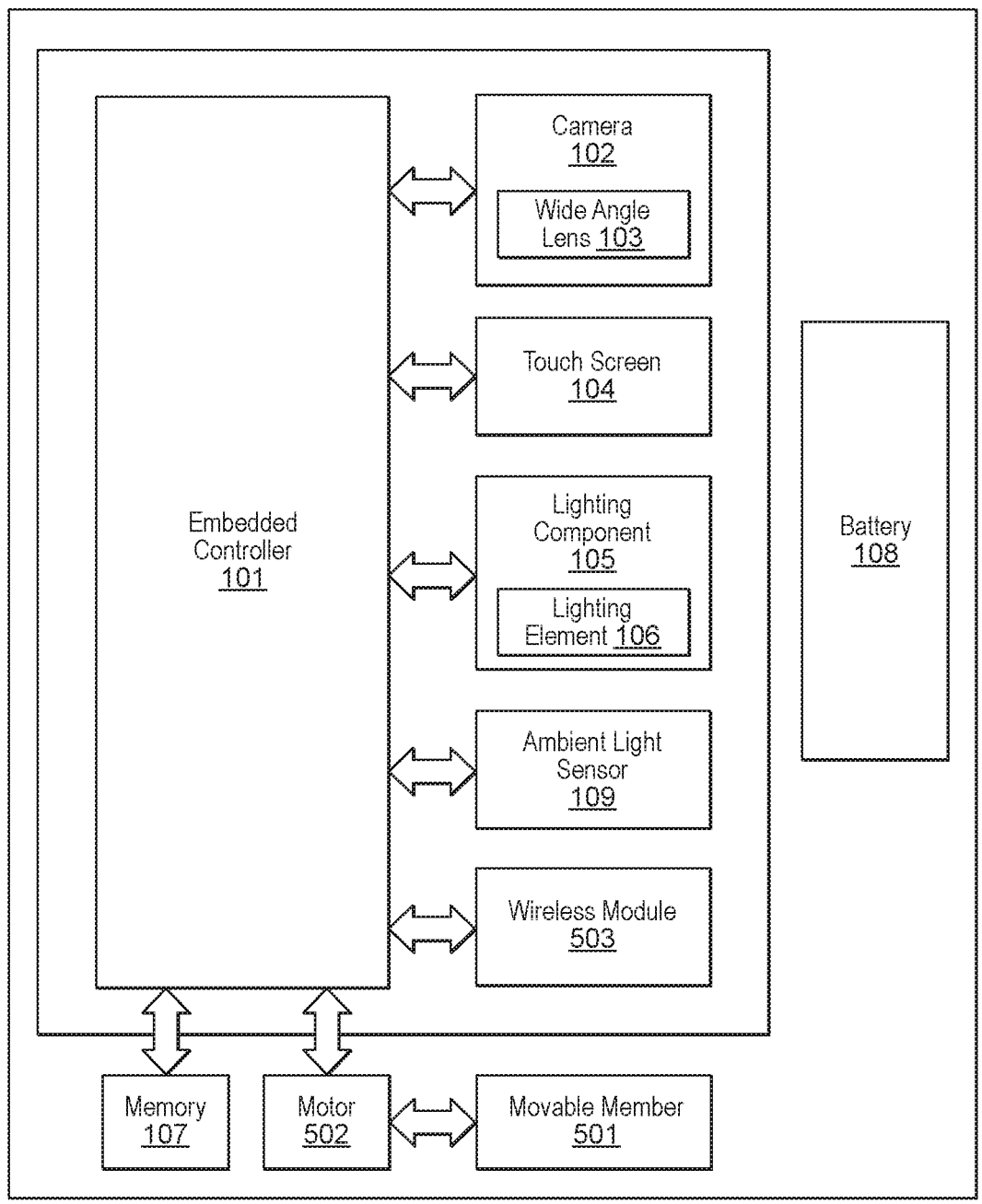
FIG. 5 shows a block diagram of a mobile portable inspection device.

In one embodiment, the portable inspection device is mobile. This is particularly advantageous where the device is used for e.g. outdoor applications, and may also be helpful when the device is used for industrial inspection applications. FIG. 5 shows the device 100 of FIG. 1, further comprising at least one movable member 501 and a motor 502, and a wireless module 503 to allow the device to be driven. The at least one movable member 501 may comprise one or more wheels, caterpillar tracks, or any other suitable mechanism for moving the device 100 along a surface. The movable member 501 is positioned on the base of the device 100, such that the device 100 can move around whilst recording video. The movable member 501 is driven by the motor 502, such that the device 100 is self-propelling. The wireless module 503 is configured to receive and execute signals from a remote controller. The wireless module 503 may comprise a radio receiver. The portable inspection device 100 may additionally comprise a GPS module and/or satellite navigation system configured for locating the current position of the device 100. In some implementations the device may be fitted with a motion detection system or collision avoidance system configured to prevent the device 101 from colliding with other objects. The controller 101 may be configured via software to control the motor 502 to divert or stop the device 100 in the event that a collision is anticipated due to detection of relative motion between the device 100 and a nearby object. In some self-propelled examples, the mobile device may include one or more solar panels to charge a battery of the device as described above.

In an embodiment, the embedded controller 101 is configured to receive, via the wireless module 503, instructions from the user to initiate motion of the portable inspection device 100. The controller 101 is further configured to drive the at least one so movable member 501 of the device using the motor 502. In this way, the user can remotely control the device 100 to move within the industrial equipment. For example, the user can drive the device 100 into a hard-to-reach or internal area of the industrial equipment without using a conveyor belt of the equipment, thus enabling more areas to be inspected. In an embodiment, the device 100 can be driven directly via the touch screen 104 without receiving a signal from a remote controller.

Example Use Cases

Figure 6:
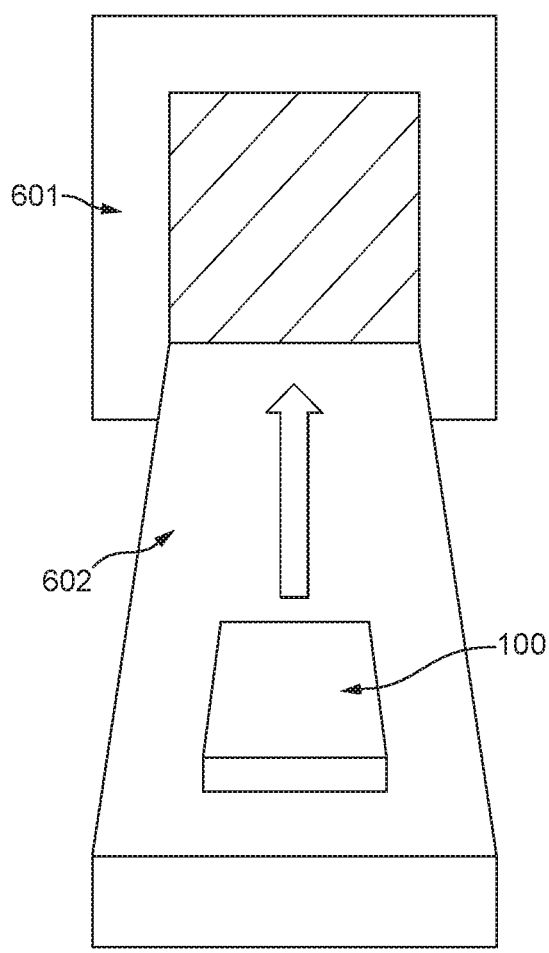
FIG. 6 shows a schematic view of the portable inspection device in use inspecting industrial equipment.

FIG. 6 shows a schematic view of the device 100 in use inspecting industrial equipment. The device 100 is placed on a conveyor belt 602 of an industrial equipment 601. As the conveyor belt 602 moves through the industrial equipment, the device 100 captures a video recording of the surrounding industrial equipment 601. In this way the area of industrial equipment spanning the full length of the conveyor belt 602 can be inspected.

Figure 7:
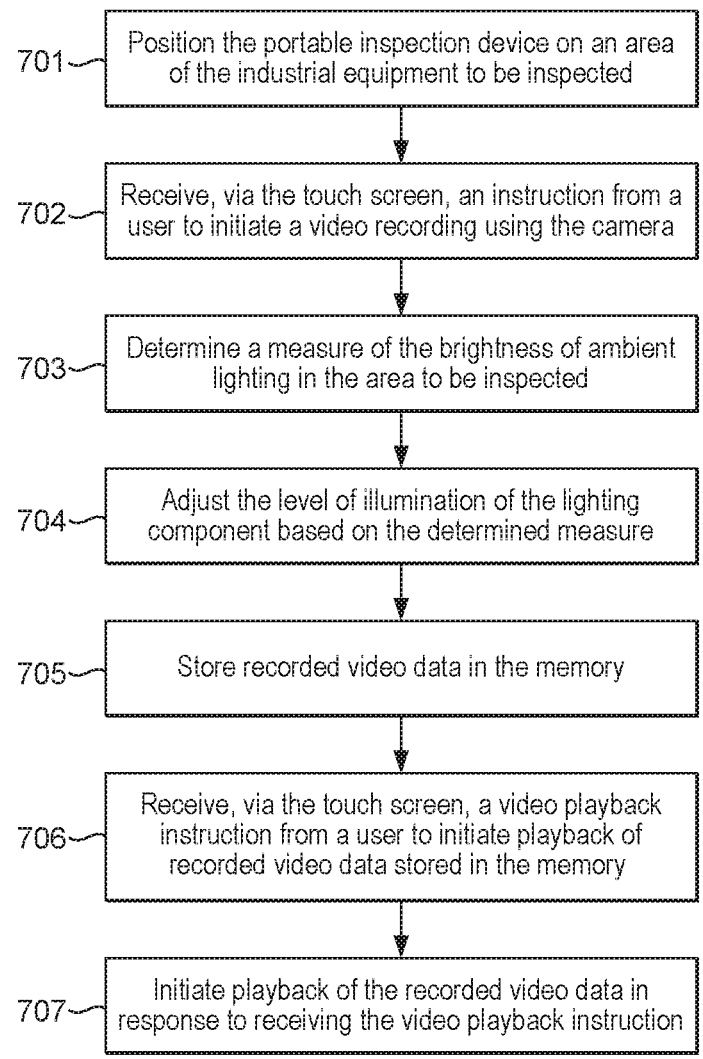
FIG. 7 shows a method for inspecting industrial equipment with a portable inspection so device.

FIG. 7 shows a method for inspecting industrial equipment using the portable inspection device 100 of FIG. 1. At step 701 the portable inspection device 100 is positioned in an area of the industrial equipment to be inspected (e.g. on a conveyor belt 602 of the industrial equipment 601). The device 100 can then be moved into position by the conveyor belt 602. Alternatively, the device 100 can continuously record video of the surroundings as it is borne through the industrial equipment 601 by the conveyor belt 602. In another embodiment, the device 100 is positioned directly in the area to be inspected. In another embodiment, the user can remotely control the device 100 to drive through the equipment or to the desired position as described above.

In an embodiment, the industrial equipment is an oven. Alternatively, the industrial equipment may be cooling equipment such as a freezer or cooling tunnel. In an embodiment the industrial equipment may be a spiral-type or multi-rack oven or cooler, or freezers.

At step 702, an instruction is received from a user indicating that the device 100 should initiate video recording using the camera 102.

Figure 8A:
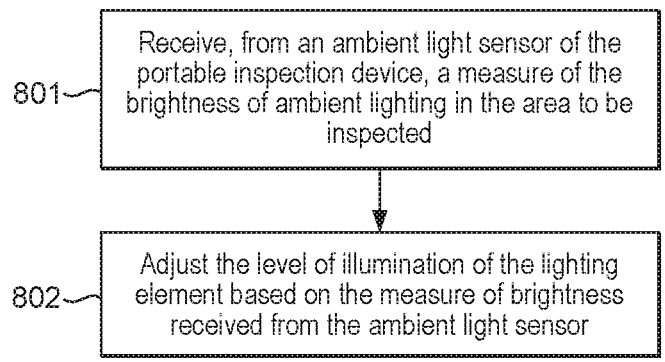
FIGS. 8*a* and 8*b* show methods for measuring ambient light levels and adjusting the level of illumination of the lighting component.

At step 703, a measure of the brightness of ambient lighting in the area to be inspected is determined. FIG. 8a shows a method for measuring the brightness of the ambient lighting in the area to be inspected. At step 801 the embedded controller 101 receives a measure of the brightness of the ambient lighting from the ambient light sensor 109. The ambient light sensor 109 could be, for example, a photosensor (e.g. photodiode or daylight harvesting type sensor) which generates an electrical signal dependent on the amount of light received at the photosensor. The controller 101 is configured to monitor the signal generated by the ambient light sensor 109 and adjust the illumination of the lighting component 105 based on the signal. At step 802 the controller 101 adjusts the illumination provided by the lighting component 105 based on the measure of brightness provided by the ambient light sensor 109. For example, the controller 101 may generate a further electrical signal in the form of a control signal which the lighting element 106 is configured to respond to.

Figure 8B:
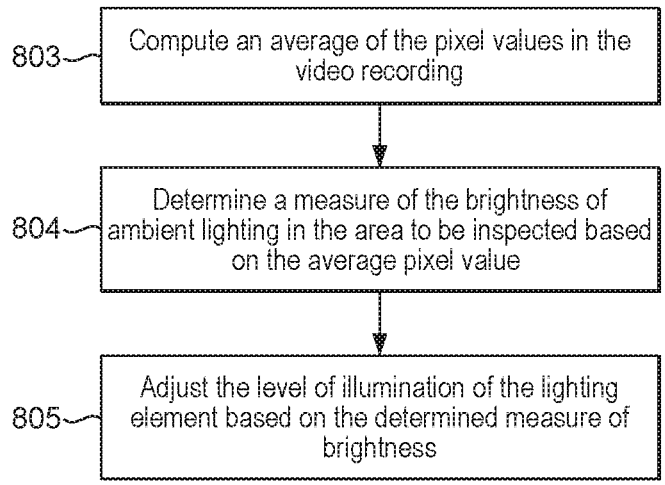

In another embodiment, the brightness of the ambient lighting is determined from the recorded video data, as shown in FIG. 8b. At step 803 the controller 101 computes an average of the pixel values in the video recording. At step 804 the controller 101 determines a measure for the brightness of the ambient lighting based on the average pixel value, e.g. by multiplying the average pixel value by a predetermined factor. At step 805 the controller 101 adjusts the illumination provided by the lighting component 105 based on the determined measure of brightness of ambient lighting. Note that the 'average pixel' method described here is just one example of determining a measure of the brightness of the ambient lighting from the video data obtained using the camera. Those skilled in the art would easily comprehend that any suitable method could be used. For example, the determined measure of brightness may be any suitable measure of image quality determined by processing the video data obtained using the camera with the controller 101.

At step 704, the level of illumination provided by the lighting component 105 is adjusted based on the measure of the brightness of the ambient lighting. For example, if the controller determines that the image quality of the video obtained by the camera is below an acceptable level (e.g. below a certain threshold), then it may increase the illumination provided by the lighting component 105. Alternatively, if the controller determines that the image quality of the video obtained by the camera is above an acceptable level (e.g. above a certain threshold), then it may decrease the illumination provided by the lighting component 105. Alternatively, or in addition, the level of illumination provided by the lighting component 105 may be adjusted in dependence on a signal from ambient light sensor 109 (if present).

In one embodiment the one or more lighting elements 106 of the lighting component 105 are individually turned on and off in response to the ambient brightness. For example, when the device 100 is used in a dimmer area, such as when the ambient lighting is below a given brightness threshold, more lighting elements can be turned on to provide additional illumination. Alternatively, when the device 100 is used in a well-lit area, such as when the ambient lighting is above a given brightness threshold, more lighting elements can be turned off, as additional illumination is not required. In one embodiment, the illumination of the one or more lighting elements 106 can be continuously varied in response to the ambient brightness. The device may include a dimmer module to control the illumination provided by the lighting component 105. The controller may adjust the illumination of the lighting component 105 via the dimmer module.

At step 705, the recorded video data is stored in the memory 107 of the portable inspection device 100. At step 706, an instruction is received from a user to initiate playback of the recorded video data stored in the memory 107. During playback, the recorded video data is displayed on the touch screen 104. In an embodiment, playback further comprises receiving, via the touch screen 104, an instruction from the user to zoom the displayed image, and zooming the image in response to the user instruction. In an embodiment, playback further comprises receiving, via the touch screen 104, an instruction from the user to translate the displayed image, and translating the image in response to the user instruction. Translating the image can comprise moving the displayed image left, right, up or down on the screen.

Software

Figure 9:
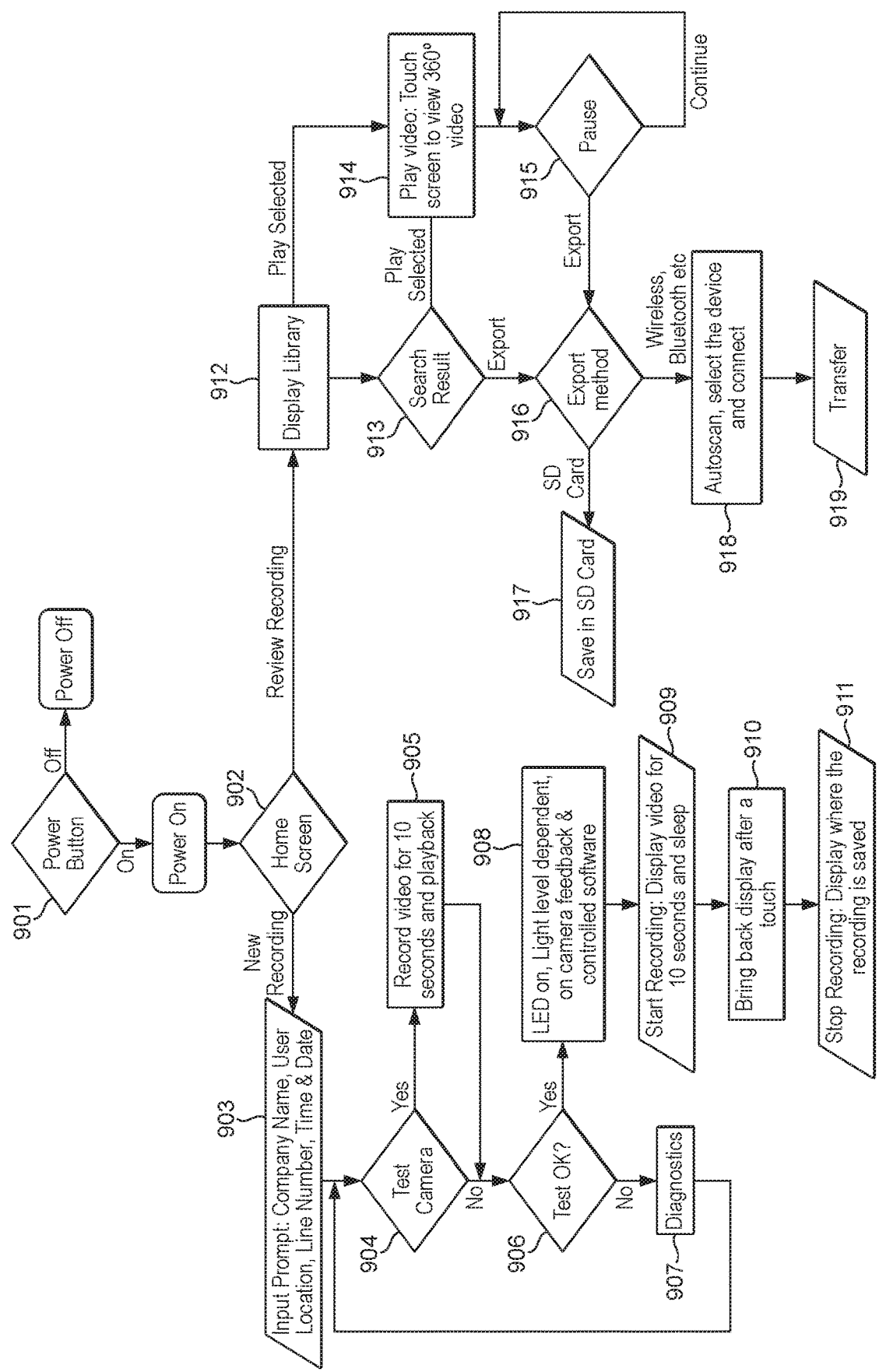
FIG. 9 shows a flow diagram depicting particular functionality the portable inspection device may perform.

The embedded controller 101 and/or the memory 107 of the device 100 may include computer-readable code (e.g. software code), which when executed by the controller 101, causes the device 100 to perform certain functionality. FIG. 9 shows a flowchart showing certain functionality which the device may perform. The software code may include an operating system, e.g. a multi-language operating system, to facilitate operation of certain functionality of the device 100.

In some implementations, the operating system may be operated wirelessly e.g. over Wi-Fi via a remote desktop protocol (RDP) or other remote connection. In some cases the remote connection may be a read only connection. Remote connection to the device permits live streaming of video data captured by the camera of the device, e.g. a live broadcast of video data to one or more remote devices.

Turning to FIG. 9, as shown in block 901, the device is turned on by the power button 202. A home screen 902 is displayed on the touch screen 104, from which the user can select to begin a new recording or to review an existing recording.

Upon selecting to begin a new recording, the user is prompted 903 to input contextual information, such as the time, date and location of the recording. At block 904, the user can then choose to test the camera 102. If the test is selected 905, the camera 102 records a video for 10 seconds and plays it back. If the test recording is not okay, the user can run diagnostics 907 on the device 100 to investigate the problem, and then repeat the test 904. If the test is okay, the user can initiate a new video recording. At block 908 the lighting component 105 is turned on and the illumination adjusted based on a measure of the ambient brightness. The recording is then started 909. The recorded video is displayed on the touch screen 104 for an initial period of 10 seconds, before the touch screen 104 sleeps. The display can be woken by a user touch input 910. The user can instruct the device 100 to stop the recording 911. The recorded video data is then stored in the memory 107 of the device 100.

In some examples, the controller may be configured to only permit a recording to be initiated if certain conditions are met. The conditions may be that 1) there is sufficient battery level 2) the system lighting is operational to provide the camera with the correct level of light for optimum high quality recordings 3) there is sufficient storage in the memory of the device for the recording.

Upon selecting to review a previous recording, a library of recorded video data is displayed 912 to the user. The user can select a video recording to playback from the displayed library, or else search 913 the library to find a particular recording. During playback 914, the video can be paused 915 and continued via user input. The user can choose to export 916 the recorded video data to an external memory, e.g. by wireless connection (e.g. Wi-Fi or Bluetooth) or wired connection (e.g. USB). The recorded video data can be saved 917 e.g. via USB or onto an SD card inserted into the portable inspection device 100. Alternatively, at block 918 the device 100 can scan for and connect with a remote device, such as via a wireless or Bluetooth connection. The data can then be transferred 919 to the remote device.

In one embodiment, a library of video recordings may be stored on the device (or externally), each relating to a different passes through each of a plurality of different production lines. The video recordings may be categorised based on production line (or area of industrial equipment). For example, video recording may be stored for passes through the same line (or the same area) at intervals, e.g. 2 or 3 month intervals. The device may be configured so that video recordings made at different times may be displayed simultaneously on the touch screen of the device so that the user can compare them. In some implementations, the user may able to annotate or highlight areas of interest or differences between displayed videos using annotation techniques described herein, and store the annotations alongside the stored video data.

In some embodiments, the controller may be configured to recognize changes between different video recordings stored for the same line (or for the area of industrial equipment). Various algorithmic techniques for comparing video recordings to identify differences are known per se to those skilled in the art and will not be described in detail here. In general terms, the controller may access the appropriate recorded video data stored in the memory 107 of the portable inspection device 100. The software then compares a video recording of the area (or line) to be inspected with recorded video data of the same area (or line) using video processing techniques, to identify differences between the video recording and the recorded video data. In this way, changes to the industrial equipment that have occurred over time can be identified. Such changes could include, but are not limited to, missing components, faults or damage to components, obstructions, or wear and tear such as rust. Alternatively, or in addition the controller may be configured to identify objects in video recordings using object recognition software, e.g. to identify obstructions, loose parts, or parts which are not positioned as they should be. Suitable machine vision techniques for identifying particular objects in video image data are known per se to those skilled in the art and will not be described in detail here. Through the use of machine vision techniques, it may be possible to detect very small missing parts (e.g. an M3 screw) at for example 5 m distance.

In one embodiment, the software may be configured to de-warp image captured by the camera to remove projection effects using one or more known de-warping algorithms. For example, if the wide angle lens 103 is a fish-eye lens, the edges of the image may be distorted, and suitable de-warping algorithms may be used to de-warp the captured image to remove these distortions and transform the image onto a 2d plane.

Various modifications and variations will be apparent to those skilled in the art which fall within the scope of the following claims.

The invention claimed is:

1. A portable inspection device for inspecting industrial equipment, comprising:

a lighting component configured to provide an adjustable level of illumination, the lighting component comprising one or more lighting elements, wherein the brightness of the one or more lighting elements can be continuously varied;
a camera having a wide angle lens, configured for recording a video of an area to be inspected;
a memory for storing video data captured by the camera;
a touch screen configured to receive input from a user, and to display output video; and
a controller, embedded in the portable inspection device, configured to:
receive, via the touch screen, an instruction from a user to initiate a video recording using the camera;
process video data obtained using the camera to determine a measure of the brightness of ambient lighting in the area to be inspected;
adjust the level of illumination of the lighting component based on the determined measure;
store recorded video data in the memory;
receive, via the touch screen, a video playback instruction from a user to initiate playback of recorded video data stored in the memory; and
initiate playback of the recorded video data in response to receiving the video playback instruction.

2. The portable inspection device of claim 1, wherein the device comprises a single camera.

3. The portable inspection device of claim 1, wherein the one or more lighting elements can be individually turned on and off to provide an adjustable level of illumination.

4. The portable inspection device of claim 1, comprising a dimmer module configured to vary the brightness of the one or more lighting elements, wherein the controller is configured to adjust the level of illumination of the lighting component by sending a control signal to the dimmer module.

5. The portable inspection device of claim 1, wherein the one or more lighting elements comprise one or more light-emitting diodes, wherein the one or more light-emitting diodes comprise one or more high-CRI LEDs.

6. The portable inspection device of claim 1, wherein the wide angle lens comprises a fish eye lens or a panoramic lens.

7. The portable inspection device of claim 1, wherein the controller is configured to process video data obtained using the camera to recognise anomalies relating to the industrial equipment.

8. The portable inspection device of claim 1, further comprising a battery to power the device and one or more solar panels to charge the battery.

9. The portable inspection device of claim 1, wherein the touch screen comprises a capacitive touch screen configured for pinch and zoom functionality.

10. The portable inspection device of claim 1, further comprising at least one movable member for moving the device along a surface, wherein the at least one movable member comprises one or more wheels.

11. The portable inspection device of claim 10, further comprising a wireless module configured to receive instructions for moving the device from a remote controller.

12. The portable inspection device of claim 10, further comprising a GPS module configured to determine the current position of the device.

13. The portable inspection device of claim 10, comprising a motor to drive the at least one movable member, and a motion detection system for collision avoidance, wherein the controller is configured to control the motor to divert or stop the device in the event that collision is anticipated due to detection of relative motion between the device and another object by the motion detection system.

14. The portable inspection device of claim 1, wherein the device is configured to export video data to an external memory through either a wired or wireless connection.

15. A method for inspecting industrial equipment, comprising:
receiving, via a touch screen of a portable inspection device, an instruction from a user to initiate a video recording using a camera of the portable inspection device;
processing video data obtained using the camera to determine a measure of the brightness of ambient lighting in an area to be inspected;
adjusting the level of illumination of a lighting component of the portable inspection device based on the determined measure, wherein the lighting component comprises one or more lighting elements and wherein the brightness of the one or more lighting elements can be continuously varied;
storing recorded video data in a memory of the portable inspection device;
receiving, via the touch screen, a video playback instruction from a user to initiate playback of recorded video data stored in the memory; and
initiating playback of the recorded video data in response to receiving the video playback instruction.

16. The method of claim 15, wherein the portable inspection device is positioned on a conveyor belt of the industrial equipment.

17. The method of claim 16, comprising recording said video recording as the device is conveyed through the industrial equipment by the conveyor.

18. The method of claim 17, wherein the industrial equipment comprises an oven and wherein the device is conveyed through the oven by the conveyor.

19. The method of claim 15, wherein adjusting the level of illumination of the lighting component comprises individually turning on/off individual elements of the lighting component.

20. The method of claim 15, wherein playback of the recorded video data further comprises:
receiving, via the touch screen, an instruction from the user; and
zooming and/or translating the image on the screen in response to the user instruction.

* * * * *